Aug. 25, 1936.  C. I. HARTMANN  2,052,292

ROLLER BEARING ASSEMBLY

Filed Nov. 29, 1935

Inventor
CHARLES I. HARTMANN
By V. T. Hassagne,
Atty.

Patented Aug. 25, 1936

2,052,292

UNITED STATES PATENT OFFICE 2,052,292

ROLLER BEARING ASSEMBLY

Charles I. Hartmann, Chicago, Ill., assignor to International Harvester Company, a corporation of New Jersey Application November 29, 1935, Serial No. 52,178

8 Claims. (Cl. 308—217)

This invention relates to a roller bearing assembly, and more particularly to the end rings of the assembly.

It is an important object of the invention to provide a roller bearing assembly consisting of cylindrical bearing rollers carried by end rings, said end rings formed U-shaped in cross section and providing annular channels at the outer ends and bearing roller sockets at the inner ends thereof.

Another object is to provide said end rings with an annular channel at the outer ends communicating with the openings at the inner ends, said channels being adapted both to strengthen the structure of the end rings and to provide means for carrying lubricant to the bearing assembly.

Other objects and advantages will be apparent from the following specification and drawing, in which.

A plurality of bearing rollers 20 are arranged in spaced relation circumferentially about an axis and are carried at their ends by a pair of end rings 21 coaxial with respect to the axis of the rollers and held in axial spaced relation parallel with each other by spacer means comprising a plurality of spacer rods 22 interpositioned between certain of the rollers and secured at their ends to the end rings 21.

The end rings 21 are preferably formed of light sheet metal, U-shaped in cross section, providing each end ring 21 at its outer end with an annular channel 21'. Circumferentially spaced about each end ring at the inner end of the U and communicating with the annular channel 21' are openings or sockets 20' into which the ends of the bearing rollers 20 are fitted to be carried by the end rings 21.

Figure 1:
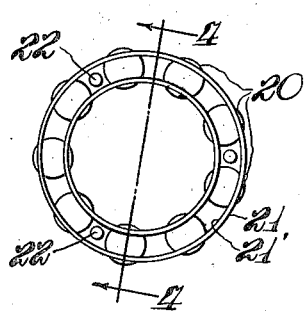
Figure 1 is an end elevational view of the preferred form of the invention showing an end ring and the bearing rollers.
Figure 2:
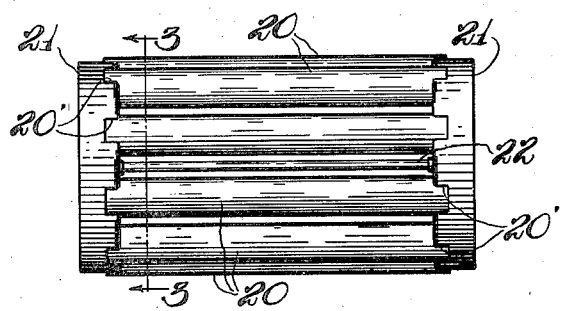
Figure 2 is a side elevational view of the same.
Figure 3:
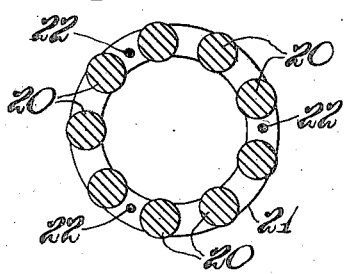
Figure 3 is a vertical sectional view, showing the inner end of an end ring and the bearing rollers therein, the section being taken on the line 3—3 of Figure 2 and looking in the direction of the arrows.
Figure 4:
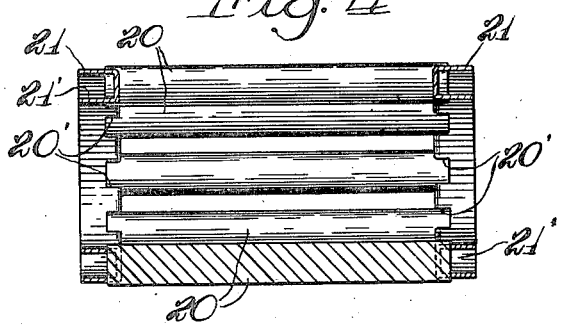
Figure 4 is a side sectional view showing the end rings and rollers, the section being viewed along the line 4—4 of Figure 1 and looking in the direction of the arrows.

As best shown in Figures 1 and 3, the diameter of a bearing roller 20 is greater than the radial distance between the inner and outer peripheries of an end ring 21, there being an overlap of the bearing rollers 20 radially beyond the inner and outer peripheries of the end rings.

Figure 5:
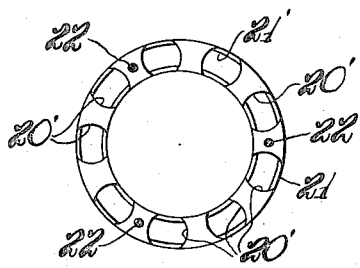
Figure 5 is a view of one of the end rings, as viewed from its inner end, showing the bearing roller sockets.
Figure 6:
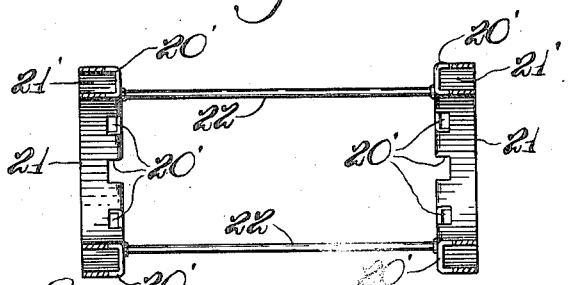
Figure 6 is a sectional view similar to Figure 4 showing the end rings and spacer means with the bearing rollers removed.

As best shown in Figure 5, each opening or socket 20' is shaped to carry the end of a bearing roller 20, the width of each opening or socket 20' circumferentially with respect to an end ring being equal to the diameter of a bearing roller. The width of each opening or socket 20' radially with respect to an end ring 21 is limited radially by the inner and outer peripheries of the end rings, providing for the aforesaid overlap of the bearing rollers 20 radially beyond the inner and outer peripheries of the end rings 21.

Figure 7:
Figure 7 shows a modification of the construction shown in Figures 1 to 6, illustrating only a portion of an end ring, L-shaped in cross section, and shown with some of the bearing rollers in place; and, Figure 8 is a sectional view of the modification of the end ring shown in Figure 7, showing the L-shaped cross section and openings and a portion of a bearing roller in place.
Figure 8:
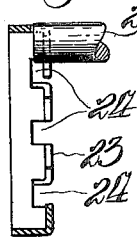

In the modification of the end ring construction shown in Figures 7 and 8, each end ring 23 is formed L-shaped in cross section and is provided with openings 24 adapted to receive the bearing rollers 20. Each bearing roller 20 is of a diameter greater than the radial distance between the inner and outer peripheries of the end ring 23, and the assembly of the end ring 23 and bearing rollers 20 is identical with that of the construction illustrated in Figures 1 to 6.

In operation as an anti-friction bearing the bearing assembly is strengthened materially by the U-shaped or L-shaped construction of the end rings 21 or 23, the annular channels 21' provided in the end rings 21 carrying lubricant to the bearing rollers and associated parts through the communication thereof with the openings or sockets 20'.

Only preferred embodiments of the invention have been shown and described, and numerous constructions may be designed similarly without departing from the scope of the appended claims:

What is claimed is:

1. In a roller bearing assembly, the combination of a pair of end rings, each ring formed with an annular radial portion and an adjacent annular circumferential portion, said rings being formed with circumferentially spaced openings extending from the radial portion into the circumferential portion, a plurality of bearing rollers of uniform diameter throughout their lengths fitted into the openings, the diameter of each roller being greater than the radial thickness of the ring cross section and overlapping the inner and outer peripheries of the rings, and means for securing the rings in axially spaced position.

2. In a roller bearing assembly, the combination of a pair of axially spaced end rings L-shaped in cross section, each ring being formed with circumferentially spaced openings extending inwardly from the radial face of the ring, a plurality of bearing rollers of uniform diameter throughout their lengths fitted into the openings, the diameter of each roller being greater than the radial thickness of the ring cross section and overlapping the inner and outer peripheries of the rings, and means for securing the rings in axially spaced position.

3. In a roller bearing assembly, the combination of a pair of axially spaced end rings U-shaped in cross section with the open sides at the ends, said rings being formed with circumferentially spaced sockets extending inwardly from the closed radial faces of the rings, a plurality of bearing rollers of uniform diameter throughout their lengths fitted into the sockets, the diameters of said rollers being greater than the radial thickness of the ring cross section and overlapping the inner and outer peripheries of the rings, and means for securing the rings in axially spaced position.

4. In a roller bearing assembly, the combination of a pair of axially spaced end rings U-shaped in cross section with the open sides at the ends, said rings being formed with circumferentially spaced sockets extending inwardly from the closed radial faces of the rings, a plurality of bearing rollers fitted into the sockets, the diameters of the ends of said rollers being greater than the radial thickness of the ring cross section and overlapping the inner and outer peripheries of the rings, and spacing elements secured at opposite ends to the radial faces of the rings.

5. In a roller bearing assembly, the combination of a pair of axially spaced end rings formed at their outer ends with annular channels and at their inner ends with circumferentially spaced sockets communicating through the end rings with the channels; a plurality of circumferentially spaced bearing rollers fitted into the sockets in the end rings, the diameter of the ends of each roller being greater than the radial distance between the inner and outer peripheries of an end ring; and spacer means between the end rings.

6. In a roller bearing assembly, the combination with a plurality of bearing rollers arranged in spaced relation circumferentially about an axis, of a pair of axially spaced end rings coaxial with respect to the axis of the rollers, each end ring formed at its outer end with an annular channel and at its inner end with a plurality of circumferentially spaced openings communicating with the channel, the widths of the openings circumferentially with respect to the end ring being greater than the radial distance between the inner and outer peripheries of an end ring, the ends of the rollers being fitted in the openings and carried at opposite ends by the end rings, the peripheries of the ends of the rollers extending radially beyond the inner and outer peripheries of the end rings; and spacer rods interpositioned between the rollers and secured at opposite ends to the end rings for holding said rings in axial spaced relation parallel with each other.

7. In a roller bearing assembly, the combination of a pair of axially spaced coaxial end rings formed at their outer ends with annular channels and at their inner ends with circumferentially spaced openings; a plurality of bearing rollers arranged in spaced relation circumferentially about the axis of the end rings and fitted into the openings in the end rings, the diameter of the ends of each roller being greater than the radial distance between the inner and outer peripheries of an end ring so that the outer periphery of each end ring is less than the outer periphery of the ends of the rollers and the inner periphery of each end ring is greater than the inner periphery of the ends of the rollers; and spacer rods interposed between the rollers and secured at opposite ends to the end rings for holding said end rings in axial spaced relation parallel with each other.

8. In a roller bearing assembly, the combination with a plurality of bearing rollers arranged in spaced relation circumferentially about an axis, of a pair of axially spaced end rings, each end ring formed at its outer end with an annular channel and at its inner end with a plurality of circumferentially spaced openings into which the ends of the rollers are fitted to be carried by the end rings, the peripheries of the ends of the rollers extending radially beyond the inner and outer peripheries of the end rings; and spacer means between the end rings for holding the end rings in axially spaced relation parallel with each other.

CHARLES I. HARTMANN.